April 30, 1968 R. W. MITCHELL 3,380,338

METHOD AND APPARATUS FOR COMPUTING COLOR BALANCE CHARACTERISTICS AND PREPARING IMPROVED COLOR PRINTS

Filed Aug. 10, 1965 3 Sheets-Sheet 1

Inventor
Robert W. Mitchell
By - Pendleton, Neuman, Seibold & Williams
Attorneys April 30, 1968 R. W. MITCHELL 3,380,338

METHOD AND APPARATUS FOR COMPUTING COLOR BALANCE CHARACTERISTICS AND PREPARING IMPROVED COLOR PRINTS

Filed Aug. 10, 1965 3 Sheets-Sheet 2

Inventor
Robert W Mitchell
By- Pendleton, Neuman, Seibold & Williams
Attorneys

April 30, 1968 R. W. MITCHELL 3,380,338

METHOD AND APPARATUS FOR COMPUTING COLOR BALANCE CHARACTERISTICS AND PREPARING IMPROVED COLOR PRINTS

Filed Aug. 10, 1965 3 Sheets-Sheet 3

Inventor
Robert W. Mitchell
By- Pendleton, Neuman, Seibold & Williams
Attorneys 3,380,338

METHOD AND APPARATUS FOR COMPUTING COLOR BALANCE CHARACTERISTICS AND PREPARING IMPROVED COLOR PRINTS

Robert W. Mitchell, St. Joseph, Mich., assignor to Heath Company, Benton Harbor, Mich., a corporation of Delaware

Filed Aug. 10, 1965, Ser. No. 478,665
20 Claims. (Cl. 88—24)

This invention relates to an improved method for computing the color balance in color photographic printing, to improved methods for photographically printing balanced color pictures, and to apparatus to facilitate the determination of color balance in color printing.

There are a vast number of variables which must be taken into account when preparing color prints from negatives. Color printing paper varies from batch to batch, varies with age, and its color rendition is not uniform. Furthermore, there is a wide variation in the actual color of so-called white light and while the human eye is capable of compensating for these variations in the color temperature of light, color film and printing paper do not automatically perform this compensation and, thus, startling effects are sometimes produced. Further variations from the rendition of a perfect color print result from under or over exposure of the negative, the development process, the color characteristics of the camera lens and the many variables which may be introduced by the printer or enlarger.

As a result of the foregoing variables it is generally considered standard procedure in color printing to prepare a series of prints, continuously compensating for these variables until a well balanced print is ultimately produced. This procedure is costly, time consuming, and not predictable. While efforts are sometimes made to visually judge a neagtive and select the compensating filters, this is difficult because of the very nature of color reversal and is further complicated by the practice of film manufacturers to include an overall color, usually of an orange cast, which has been found necessary to compensate for the color characteristics of the dyes used in the film and paper. This overall color is generally defined as a "mask" and that term will be used throughout this specification in its usual sense.

It is one principal object of this invention to provide an improved method for printing color pictures with a minimum amount of preliminary testing and wasted prints.

It is another object of this invention to provide an improved method for computing the appropriate printing filter media under preset conditions for obtaining optimum color balance.

It is a further object of this invention to provide improved apparatus for measuring color characteristics and computing appropriate filter compensation.

Further and additional objects of this invention wil become manifest from a consideration of this description, the accompanying drawings and the appended claims.

In one particular embodiment of this invention an improved method of producing a color print is provided wherein the printing filter media used in making the print is determined by first selecting a filter, hereinafter called a "scan filter," which is the complement of the mask, and also compensates for light variations in the enlarger and the like. When utilizing the scan filter an unexposed negative will appear neutral. An incremental portion of a known color in the negative to be printed is then viewed through said scan filter whereby said negative is "unmasked." The unmasked incremental area is then compared with a substantially neutral light which has been passed through a filter media. The filter media is selected to compensate for the color characteristic of the sensitive material on which the print will be formed in order to faithfully produce the color of said incremental area. The latter is herein termed an "index filter." By placing "printing filter media" in the viewing line of said unmasked incremental area and adjusting the printing filter media to match the filtered light from the incremental area with the light from the index filter, the proper printing filter is accurately determined. Thereafter a faithful print can be prepared on the sensitive material by placing the printing filter in the path of the printing light.

Unique apparatus is provided by this invention for performing the foregoing method, the apparatus including a substantially neutral light source, a display means, means for displaying said light source and an incremental area of a negative on the display means, and filter holders and associated filters for adjusting the light both from said source and said incremental area to compute the appropriate printing filter values.

For a more complete understanding of the invention reference will now be made to the accompanying drawings wherein.

Figure 3:
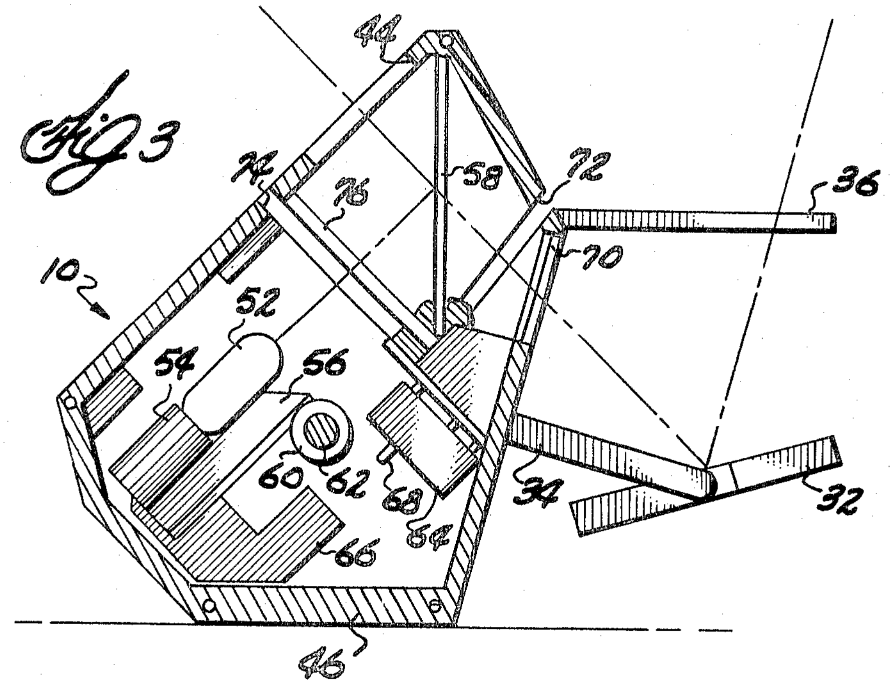
FIG. 3 is a sectional elevational view of the embodiment of FIGS. 1 and 2.
Figure 4:
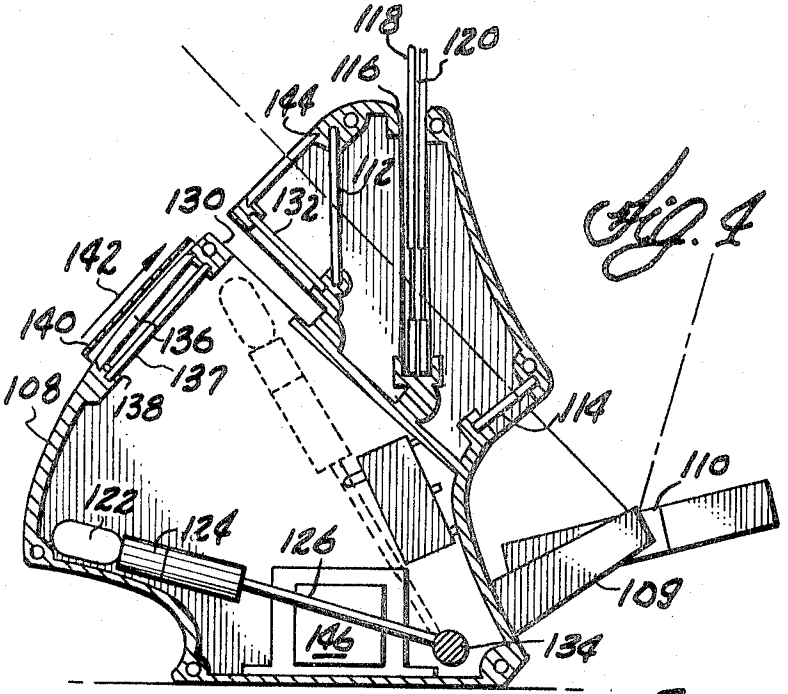
FIG. 4 is a sectional elevational view of an alternate embodiment of the invention.
Figure 6:
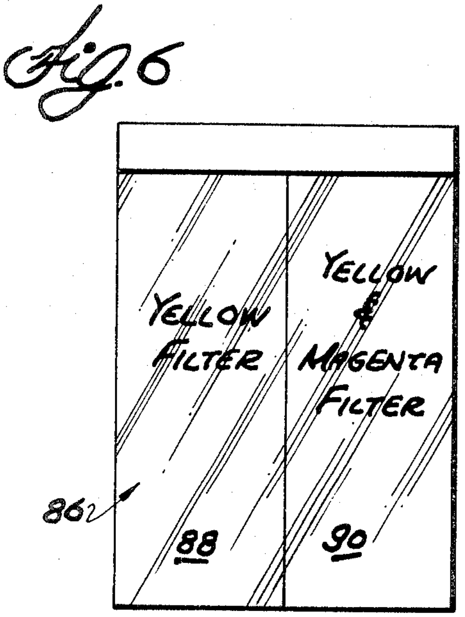
Figure 7:
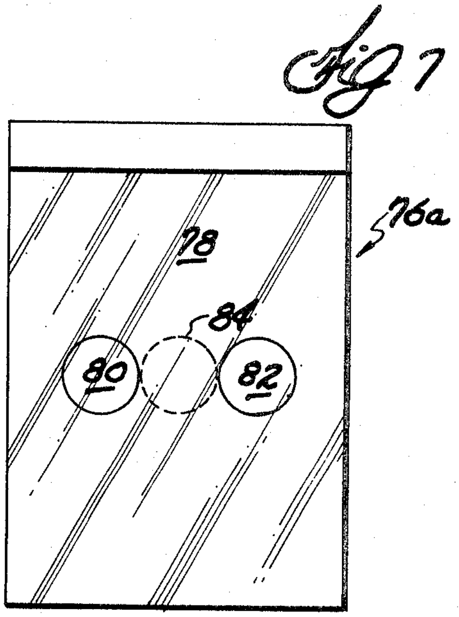
Figure 8:
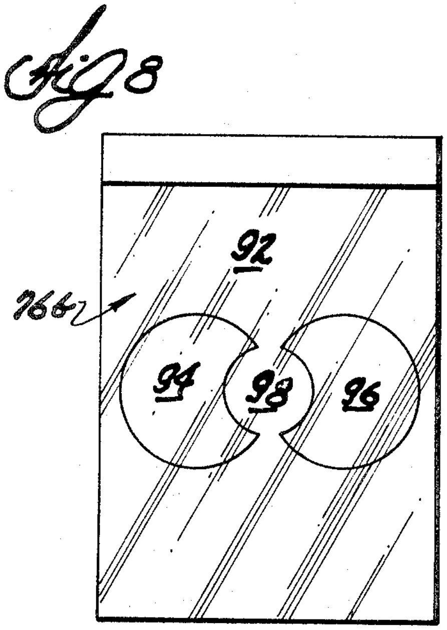
Figure 9:
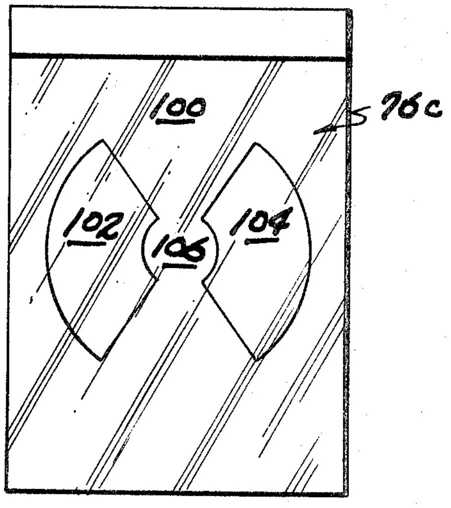

FIG. 6 illustrates one index filter which may be employed with the embodiments of FIGS. 3 and 4; and FIGS. 7, 8, and 9 are enlarged illustrations of three alternative reticles which may be employed with the embodiments of FIGS. 3 and 4.

*General operation*

Figures 1, 2, 5:
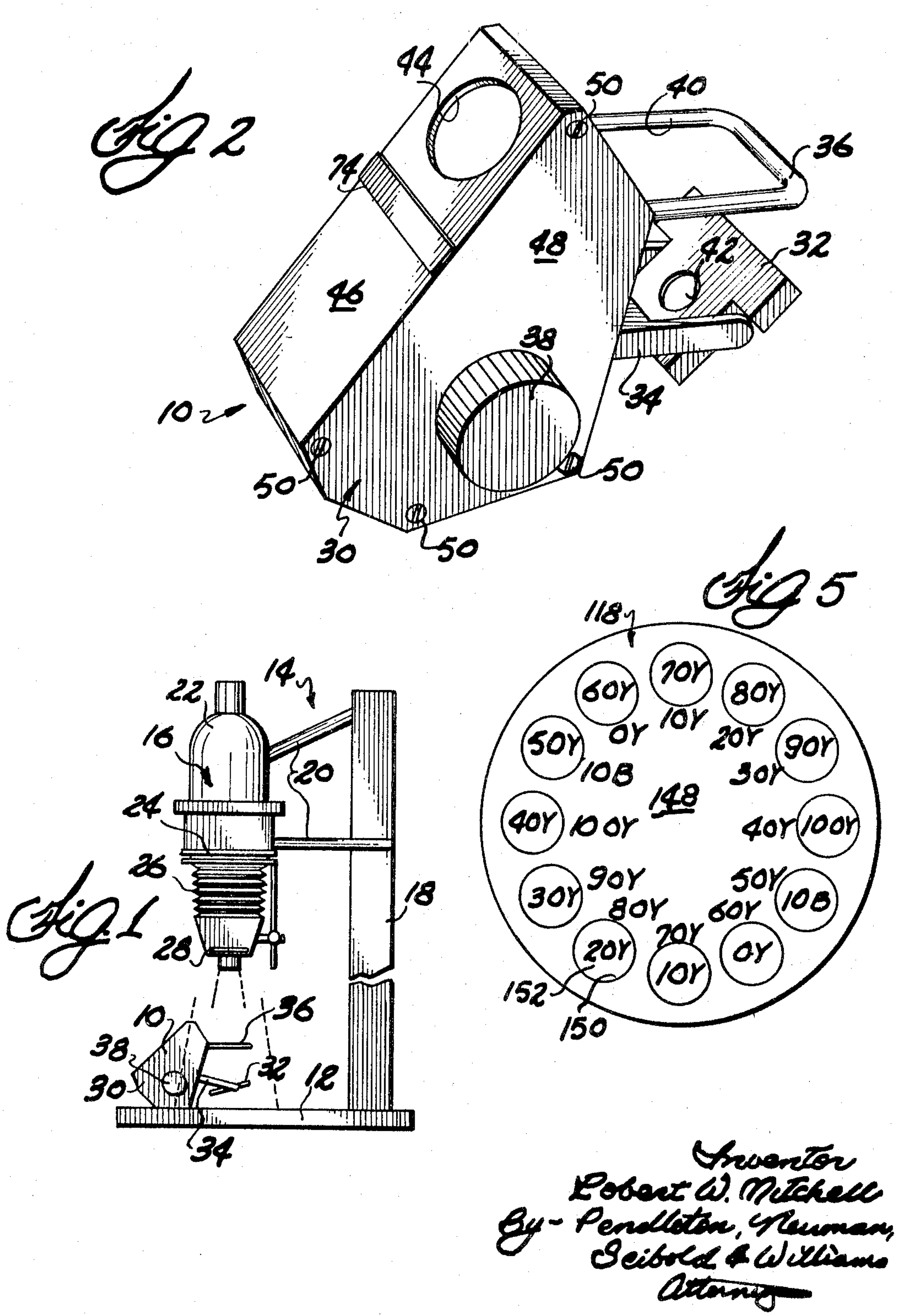
FIG. 1 is a diagrammatic illustration of one embodiment of the apparatus of this invention in association with a photographic enlarger.
FIG. 2 is a perspective view of the embodiment shown in FIG. 1.
FIG. 5 is an illustration of one filter medium assembly utilized with the embodiment of FIG. 4.

Referring now to the drawings and more particularly to FIG. 1, a computer apparatus 10 is illustrated resting on the easel or horizontal viewing surface 12 of a conventional photographic enlarger 14. An enlarging head 16 is adjustably supported on an upright 18 through a transverse assembly 20. The enlarger may be any one of many commercially available devices and in its simpler form includes a light source in housing 22, a negative tray 24, a bellows 26 and a filter tray 28.

For simplicity in illustration the column 18 has been foreshortened and the distance betwen the head 16 and easel 12 is normally greater than that shown. Also the apparatus 10 is shown somewhat enlarged in relation to the enlarger for clarity. The apparatus 10 includes a housing 30 having a yoke 34 mounted thereon which supports a mirror member 32 so that the mirror member may be adjusted about two axes and thus may be adjusted in two planes. The mirror member 32 projects the light source of enlarger 14 into the computer apparatus 10 in a manner to be described where it is compared with an internal light source. A shelf 36 is provided for supporting test printing filter media and knob 38 controls the intensity of the light source within computer 10.

*The embodiment of FIG. 3*

The details of computer 10 are more clearly seen in FIG. 2 and 3. The filter shelf 36 has an opening 40 which passes light to a small circular mirror 42 mounted in white mirror support 32. The mirror support 32 is mounted for pivotal movement on the yoke 34 and the yoke is mounted for transverse pivotal movement on the housing 30 so that the mirror 42 may be adjusted about two axes. In other words, the mirror 42 is adjustable as the mirror in a conventional microscope. The white surface on support 32 facilitates locating computer 10 at the proper position on easel 12 to observe the portion of a color negative having a know color. The light from the mirror 42, as well as the light from the internal source, is viewed through the viewing opening 44. The housing 30 is preferably made up of an integral body portion 46 with a pair of end plates 48 secured thereto by any convenient means such as machine screws 50.

The internal construction of the computer 10 is illustrated best in FIG. 3. A neutral light source 52 is mounted in an appropriate socket 54 which is, in turn, mounted on a carriage 56. The carriage 56 is carried in guideways formed in the end plates 48 and is driven toward and away from the partially transparent sheet 58 by a rubber drive wheel 60 mounted on shaft 62. Shaft 62 passes through trunnions in the end plates 48 and has a knob 38 secured to each end thereof.

The wiring of light 52 is completely conventional and therefore the details thereof are omitted. However, the light is preferably wired to a source of power through a sensitive normally closed switch 64. When the light 52 is moved to its extreme forward position a stop 66 carried thereby engages the switch actuator 68 and deenergizes the light. While the light 52 has been described as neutral this is not used in a rigorous sense. The light is preferably a conventional incandescent light operated at nominal voltage so that the light is slightly reddish: The effect of any color in the light 52 is fully compensated in arriving at the proper scan filter to be described.

The partially reflective sheet 58 is of a conventional type sometimes referred to as a beam splitter. Light from mirror 42 is transmitted therethrough with reasonable efficiency while light from source 52 is reflected, and the light from the two sources appear to merge. It is preferred that the beam axis of light source 52 be substantially normal to the beam axis of the mirror 42. However, in any event the plane of the sheet 58 should bisect the angle formed by the two beams.

A forward opening 70 is formed in housing body 46 and a slot 72 is formed adjacent to the forward opening to receive the scan filter. A similar slot 74 is formed in the housing 30 adjacent light source 52 to receive the index filter media and a reticle 76 is secured within the housing 30 adjacent slot 74.

*Color Patterns*

The reticle 76 may have any one of a plurality of configurations three of which are illustrated in FIGS. 7, 8 and 9. The reticle 76*a* of FIG. 7 comprises an opaque sheet 78 having two spaced circles 80 and 82 which are translucent. The two circles 80 and 82 are preferably the same size as the projected image of the enlarger aperture as viewed through the sheet 58. The projected image is diagrammatically illustrated by broken lines 84.

One typical index filter 86 is illustrated in FIG. 6 and includes a yellow portion 88 and a yellow and magenta portion 90. Thus, when index filter 86 is in place in slot 74 and a selected incremental area of a negative is being read by mirror 42, the viewer sees two adjacent circles of color in the viewing opening 44.

In the alternate embodiment of FIG. 8, a reticle 76*b* is provided with an opaque body 92 and crescent shaped translucent panels 94 and 96. When projected onto sheet 58 in computer 10, the enlarger aperture fills the space 98 between the panels 94 and 96 in a manner which facilitates matching the color from the enlarger with the filtered light source.

A third arrangement which has proven desirable in color matching is illustrated in FIG. 9 where a reticle 76*c* has an opaque body 100 with translucent panels 102 and

104 through which the filtered light passes from index filter 86. The enlarger image appears in the center 106 as a contiguous circle of light.

In the various arrangements it has been found that one can readily sense a proper color match between the enlarger image and the filtered neutral light with the displays described above. However, if desired, means can be provided for blanking one or the other of the light spots 80 or 82, 94 or 96 and 102 or 104, thus further facilitating color matching. The blanking means may be a simple slide mounted in the end panels 48 with a single aperture adapted to align with either one of the two translucent panels.

*The method of color printing*

In practicing this invention, certain preliminary steps must be performed on the apparatus: First, a scan filter must be determined for unmasking the negative and compensate for enlarger characteristics. An unexposed, developed film is placed in the film tray 24 of enlarger 14 and viewed through opening 44 in computer 10. Filter media is placed in the slot 72 to complement and thus remove the mask on the film. A cyan filter is the principal factor required in unmasking although some magenta or yellow may also be required. When the observed light is neutral, the filter pack remains in slot 72 and becomes the scan filter which automatically unmasks any negative which is now placed in carrier 24.

The next preliminary step is to prepare a print from a negative having a known color, either neutral, a flesh tone, a grass green or the like. A neutral print is most universally useful. This print is developed and provides the means for compensating for the particular sensitive paper and developing characteristics. The print is compared with the actual known color and an index filter is found to return the print to the original known color. This index filter will usually include some yellow and some magenta and in the preferred embodiment of this invention the entire index filter includes the yellow medium while only half of the filter includes the magenta compensation.

Utilizing such an index filter, it is possible to readily practice the invention by first adding yellow filtering to the printing pack to arrive at a first match, and thereafter adding magenta to accurately arrive at the total compensation. It has been found that this sequential synthesis contributes greatly to the ease of computing color correction as well as the accuracy of the computation. The index filter is now placed in filter support 74 in preparation for color printing.

A color negative to be printed is now placed over a translucent panel which has been filtered by a scan filter, as set forth hereinafter with respect to FIG. 4. The operator then selects the area he can identify for study. The color negative is then placed in carrier 24 and the incremental area of the picture selected on the white mirror support 32 for analysis. If a neutral index filter has been generated in accordance with the preferred practice, a deep shadow or other neutral area should be selected for final color computation. While a deep shadow area may appear as almost clear mask on the negative, experience has shown that these deep shadow areas do, in fact, include color information about the nature of the illumination and the compensation required for a balanced print as found in other neutral areas.

The deep shadow or other neutral area will now appear in the center of the display means 58 and can be compared with the adjacent yellow area. Yellow filter media are then placed upon shelf 36 until a color match is obtained and the number, between 0 and 100, is noted. With the yellow in place magenta is added and a match established between the second standard and the compensated deep shadow area. As these adjustments are made, the brightness of the two colored spots must be kept alike by moving light 52 toward or away from reticle 132.

Completion of the foregoing steps produces a printing filter which will substantially compensate for all variables and produce a satisfactory print on the first effort.

*The embodiment of FIG. 4*

An alternate embodiment of the computer is shown in FIG. 4 employing a housing 108 having a yoke 109 pivotally mounted thereon supporting a pivotally mounted mirror 110 and having a partially reflective sheet 112 mounted therein. A scan filter 114 is mounted between the sheet 112 and the mirror 110, and a receptacle 116 is provided in the housing 108 to support a test printing filter assembly 118 and 120.

The light source 122 and its socket 124 are carried on a pivotally mounted arm 126. Arm 126 is connected to transverse shaft 134 whereby movement by virtue of manipulation of an external knob or lever moves the source to the broken line position 128 to increase the intensity of the image on sheet 112. An index filter support 130 and reticle 132 are provided as described with respect to FIG. 3 and these are aligned with the light source 122 and the sheet 112. The computer includes a sensitive normally closed switch 164 having a switch actuator 168 which corresponds to the switch and actuator in FIG. 3, the switch being opened when the arm 126 engages the actuator to deenergize the light 122.

A translucent viewing panel 136 may be mounted in an opening 138 formed in housing 108. Behind the panel 136 is located a scan filter 137 similar to the scan filter 114. The viewing panel facilitates the overall analysis of a color negative for judging shadows, average density and the like. A sliding cover 140 covers the panel 136 when it is not in use and slides in the direction indicated by arrow 142 to cover the viewing aperture 144 when the panel 136 is in use.

The light 122 is preferably of the low voltage type and is connected directly to the secondary winding of a stepdown transformer 146. The transformer primary is connected to a utility plug through a flexible cord and switch such as that shown in FIG. 4 or the transformer and switch may be omitted if a high voltage directly connected light is employed.

One of the printing filter assembly 118 comprises a semi-rigid disc 148 with a plurality of apertures 150 formed peripherally therein to receive filter media 152. The filter media in disc 118 are all selected along the yellow axis and vary in density from 0Y to +100Y. Blue is the complement of yellow and thus one or more blue test filters are also provided. The bottom of receptacle 116 (FIG. 4) is arcuate and thus the discs 118 and 120 are cradled in the proper position so that light from mirror member 110 passes through the printing filters 152 for observation at the display aperture 144.

In addition to the disc 118 which includes filters along the yellow-blue color axis, a second disc 120 is provided having a similar set of test media along green-magenta color axis. In the disc 120 it is preferred that the individual filters vary from 0M to +100M with one or more green filters included for increased range.

To arrive at color densities of increments in units of less than ten, a sheet of CC05 and/or CC025 filter stock may be added to the light panel when the color filter assemblies are in any position.

It has been found that in almost all instances the addition of yellow and magenta filters in the printing filter provides proper color balance. In the rare instance where additional blue or green might be required, this can be provided by additional separate filter sheets.

The printing filter media is now assembled in the filter carriage 28 in FIG. 1 and the exposure completed. As a part of the overall printing process, a determination must be made of the negative density and this may be judged visually with the viewing screen 136. However, for better performance an electronic determination with a computer such as the PM–14 of the Heath Company is preferred.

This computation determines the time of exposure in printing from a given negative.

Without further elaboration, the foregoing will so fully explain the character of the invention that others may, by applying current knowledge, readily, adapt the same for use under varying conditions of service, while retaining certain features which may properly be said to constitute the essential items of novelty involved, which items are intended to be defined and secured by the following claims.

What is claimed is:

1. Apparatus for computing color balance by adjusting the color of projected light from a color source, said apparatus comprising housing means, a neutral light source disposed within said housing means, display means secured to said housing means for displaying said neutral light source and said projected light in contiguous relationship, filter support means in said housing means and in the path between one of said sources and said display means, and filter means in said support means to balance the color of light from said sources.

2. Apparatus for computing color balance in color photography by adjusting the color of projected light from a source through a known color from an incremental area of a color field comprising housing means, a neutral light source disposed within said housing means, means for selecting a predetermined incremental area of such projected light, display means secured to said housing means for displaying said neutral light source and said incremental area in contiguous relationship, and filter support means in said housing means and in the path between one of said sources and said display means to balance the color of light from said sources.

3. Apparatus for computing color balance in color photography by adjusting the color of projected light from a source through a known color in a negative comprising housing means, a neutral light source disposed within said housing means, display means secured to said housing means for displaying said neutral light source and said projected light in contiguous relationship, filter support means in said housing means in the path between said neutral light source and said display menas, and filter support means in said housing means in the path between said source of projected light and said display means.

4. Apparatus for computing color balance in color photography by adjusting the color of projected light from a source through a known color in a negative comprising housing means, a neutral light source disposed within said housing means, display means secured to said housing means for displaying said neutral light source and said projected light in contiguous relationship, means for varying the intensity of the light from said neutral light source on said display means, filter support means in said housing means in the path between said neutral light source and said display means, and filter support means in said housing means in the path between said source of projected light and said display means.

5. The apparatus of claim 4 wherein means is provided on said housing for selecting an incremental portion of said projected light and transmitting said incremental portion to said display means.

6. The apparatus of claim 5 wherein said display means is a sheet capable of substantially unilateral light transmission, the light from one of said sources being transmitted therethrough at a substantial angle with respect thereto, the light from the other of said sources being reflected therefrom at said angle whereby the two sources may be viewed together.

7. Apparatus for computing color balance in color photography by adjusting the color of projected light from a first source through a known color in a masked negative prior to printing on a sensitive material comprising housing means, a neutral light source disposed within said housing means, display means secured to said housing means for displaying said neutral light source and said projected light in contiguous relationship, filter support means in said housing means in the path between said neutral light source and said display means, index filter means in said filter support means to correct for color characteristics of said sensitive material, filter holder means in said housing means in the path between said source of projected light and said display means, and scan filter means in said filter holder means which is the optical complement of said mask.

8. The apparatus of claim 7 wherein said index filter means includes two filter areas, one of said filter areas comprising first filter media having the appropriate density of a first secondary color such as yellow required to correct for said characteristics, the other of said areas comprising said first filter media plus the appropriate density of a second secondary color such as magenta required to correct said characteristics.

9. The apparatus of claim 8 wherein said housing is adapted to rest upon a horizontal surface, a mirror mounted for adjustment on two axes being secured to said housing to receive projected light from said first source and direct said light to said display means.

10. Apparatus for computing color balance in color photography by adjusting the color of projected light from a first source through a known color in a masked negative prior to printing on a sensitive material, said apparatus comprising a housing having a base surface adapted to rest on a generally horizontal support, a mirror adjustable on two axes on said housing above said base, aligned apertures formed in said housing, the axis thereof being aligned with the intersection of the two adjustable axes of said mirror, a partially reflective sheet disposed between said apertures diagonally with respect to the axis of said apertures, a neutral light source disposed in said housing and movable along a line generally normal to the axis of said apertures and aligned with said sheet whereby the light from said neutral light source and the light from said mirror are projected together through one of said apertures, filter support means in said housing generally normal to said line and disposed between said neutral light source and said sheet, and filter holder means in said housing generally normal to said aperture axis and disposed between said mirror and said sheet.

11. The apparatus of claim 10 further including a scan filter in said filter holder means which is substantially the complement of said mask.

12. The apparatus of claim 11 further including an index filter in said filter support means which compensates the light of said neutral light source for the characteristics of said sensitive material.

13. The apparatus of claim 12 wherein said index filter includes a first portion having a filter media with the required density of one secondary color such as yellow to compensate for the characteristic of said sensitive material, and a second portion having said filter media plus further filter media of the required density of a second secondary color such as magenta to compensate for the characteristics of said sensitive material.

14. The apparatus of claim 13 including a reticle disposed between said neutral light source and said sheet providing an opaque portion separating the light through said first and second index filter portions, and providing an opaque portion aligned with the projection of the light from said mirror on said sheet.

15. The apparatus of claim 10 including a filter shelf extending outwardly from said housing and aligned with and generally normal to the path of light to said mirror.

16. The apparatus of claim 10 including a receptacle formed in said housing between said mirror and said sheet, and printing filter means disposed in said receptacle.

17. The apparatus of claim 16 wherein said printing filter means comprises a disc having a plurality of filter media of different densities disposed about the periphery thereof, said disc being rotatable in said receptacle whereby a selected one of said filter media may be aligned with said axis of the apertures.

18. Apparatus for computing color balance in color photography by adjusting the color of projected light from a source through a known color in a masked negative comprising a housing, display means in said housing, means for applying said projected light to said display means for color balancing purposes, and filter means in said housing between said display means and said applying means, said filter means having a color characteristic which is the complement of the mask on said negative.

19. A method of preparing balanced prints on sensitive material from color negatives utilizing printing equipment including a light source and a viewing area spaced therefrom, said method comprising the steps of selecting a scan filter which is the complement of the mask on said negative and viewing an unmasked incremental portion of said negative of known color therethrough, comparing said unmasked incremental portion with a substantially neutral light, passing the light from one of said sources through index filter media which compensate for the characteristics of said sensitive material placing printing filter media in alignment with said light source to match the effect of said incremental portion to the neutral light, and printing said negative on said sensitive material with said printing filter media disposed between said light source and said viewing area to produce balanced color prints from said color negatives.

20. A method of preparing balanced prints on sensitive material from masked color negatives, utilizing printing equipment including a light source and a viewing area spaced therefrom, said method comprising the steps of passing first light from said light source through an unexposed, developed color negative onto said viewing area, placing scan filter means in the path of said first light to provide second light, comparing said second light with a substantially neutral light source, adjusting said scan filter to match said second light and said neutral light, utilizing said first light to prepare a print of a known color on said sensitive material, comparing said print with said known color and placing index filter means in the path of said neutral light which has been selected to render said print the same color as said known color and thereby correct for said sensitive material, observing third light from said light source through an incremental area of a color negative having said known color, comparing said third light with said neutral light modified by said index filter means, selecting a printing filter which modifies said third light to provide fourth light matching said modified neutral light, and exposing said sensitive material to light from said light source modified by said printing filter and passed through color negative to provide a balanced print thereof.

References Cited

UNITED STATES PATENTS 3,256,770 6/1966 Wicker ---------------- 88—24
3,292,488 12/1966 Griffith ---------------- 88—24

NORTON ANSHER, *Primary Examiner.*

RICHARD A. WINTERCORN, *Assistant Examiner.*